(12) United States Patent
Tsubouchi et al.

(10) Patent No.: US 6,201,800 B1
(45) Date of Patent: Mar. 13, 2001

(54) CODE DIVISION MULTIPLEX COMMUNICATIONS SYSTEM

(75) Inventors: Kazuo Tsubouchi; Kazuya Masu, both of Miyagi-ken; Yasuhito Fujita, Myagi-ken, all of (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/024,930

(22) Filed: Feb. 17, 1998

(30) Foreign Application Priority Data

Feb. 17, 1997 (JP) .................................................... 9-032493

(51) Int. Cl.[7] .............................. H04B 7/216; H04J 13/00
(52) U.S. Cl. ......................... 370/342; 370/479; 375/143; 375/152
(58) Field of Search .................................... 370/320, 334, 370/335, 342, 441, 479, 515, 517; 375/130, 354, 355, 367, 140, 151, 147, 150, 152, 142, 143

(56) References Cited

U.S. PATENT DOCUMENTS

| 3,643,230 | 2/1972 | Lynes . | |
|---|---|---|---|
| 4,164,628 | 8/1979 | Ward et al. . | |
| 4,653,069 | * 3/1987 | Roeder | 380/31 |
| 5,276,704 | * 1/1994 | Dixon | 375/1 |
| 5,331,230 | * 7/1994 | Ichihara | 307/514 |
| 5,416,737 | 5/1995 | Lingstaedt et al. . | |
| 5,809,064 | * 9/1998 | Fenton et al. | 375/208 |

FOREIGN PATENT DOCUMENTS

| 43 17 188 A1 | 2/1995 | (DE) . |
|---|---|---|
| 0 535 808 A2 | 4/1993 | (EP) . |

OTHER PUBLICATIONS

"Low Power Consumption Matched Filter LSI for Wideband", *Institute of Electronics, Information and Communication Engineers*, Technical Report of IEICE., Mamoru Sawahashi, et al., 1996, pp. 57–62 (with English translation).

* cited by examiner

Primary Examiner—Hassan Kizou
Assistant Examiner—Duc Ho
(74) Attorney, Agent, or Firm—Brinks Hofer Gilson & Lione

(57) ABSTRACT

A code division multiplex communications system comprising: receiving circuit for receiving a radio wave and transforming the radio wave to an electric signal; delaying circuit for sequentially reading the electric signal at a timing of a clock pulse; switching circuit for shutting off a drive current of the delaying circuit at an OFF timing of the clock pulse; adding and subtracting circuit for adding and subtracting outputs of the delaying circuit in accordance with a spread code; and reproducing circuit for reproducing a transmission signal on the basis of an output of the adding and subtracting circuit. RCS95-120 is similar with respect to a point that an analog LSI matched filter is constructed by a slide capacitor system.

10 Claims, 11 Drawing Sheets

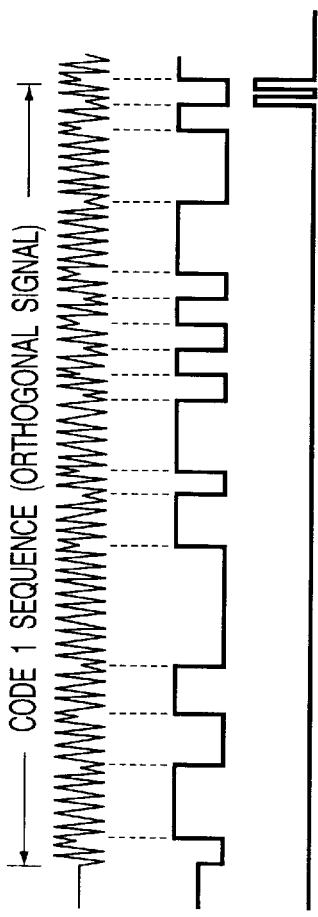
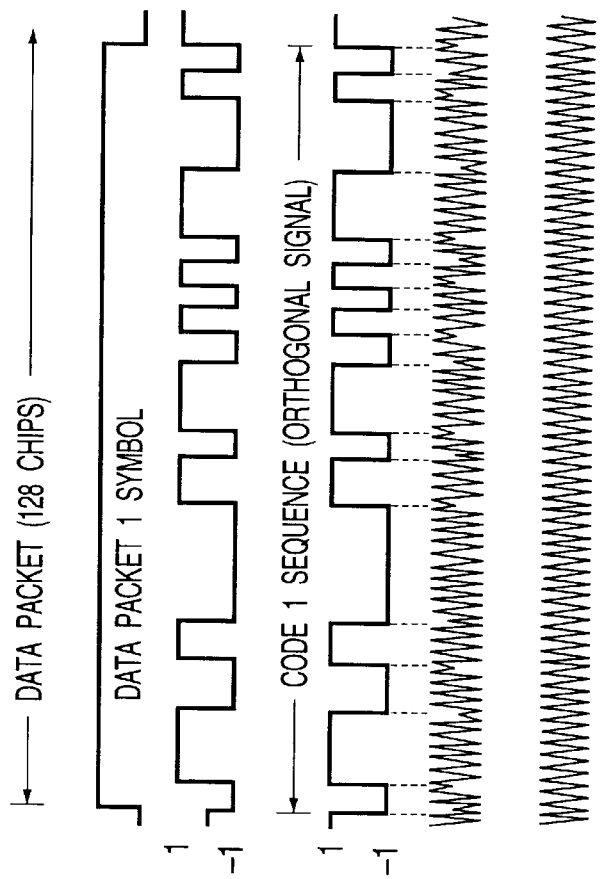
FIG. 8A
FIG. 8B
FIG. 8C
FIG. 9A
FIG. 9B
FIG. 9C
FIG. 9D
FIG. 9E

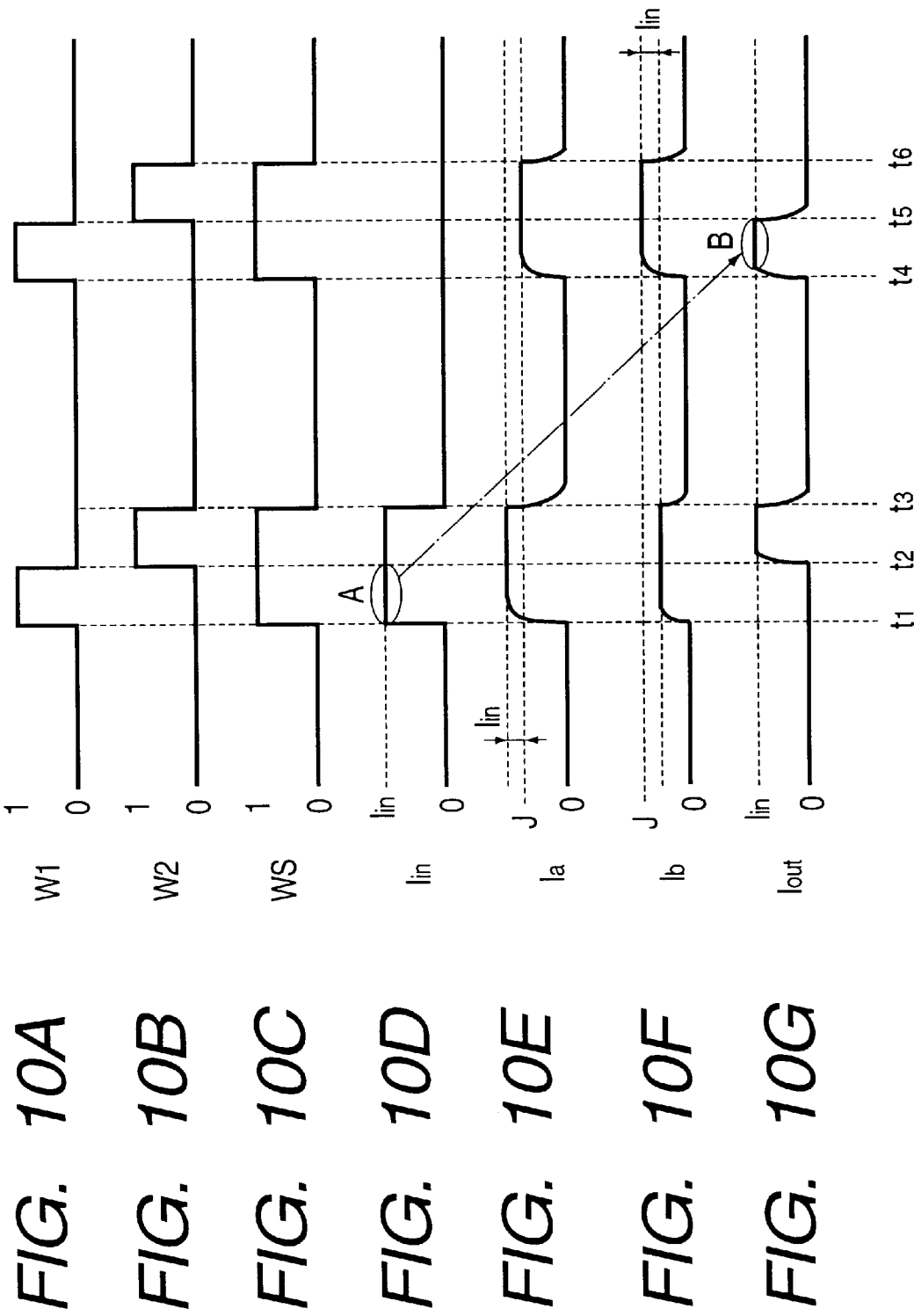

CODE DIVISION MULTIPLEX COMMUNICATIONS SYSTEM

BACKGROUND OF THE INVENTION

The present invention relates to spread spectrum communications and more particularly to a low power consumption code division multiplex communications system.

While other multiplex communication systems (FDMA, TDMA) cannot permit more than a predetermined number of users, in a code division multiple access (CDMA), since the quality of communication gradually deteriorates (graceful degradation), users can be accepted as long as the code synchronization can be set so that increase in the number of users can be expected. The CDMA has excellent interference resistance, signal concealment, and fading resistance and is being used in a wide range.

According to the CDMA communications system, in a transmitter, baseband data to be transmitted is multiplied by a spread code and further by a carrier, and resultant data is transmitted from an antenna. In a receiver, a spread code having the same phase as that of the spread code at the time of transmission is prepared and the baseband data is decoded by using a correlator.

Hitherto, sliding correlator, SAW (Surface Acoustic Wave) matched filter, digital LSI matched filter, and the like are known as correlators.

According to the sliding correlator, the spread code is cycled faster than a reception signal and a pull-in is performed by a discriminating circuit having a DLL (Delay Locked Loop) or the like. A signal obtained by eliminating carrier components by a sync detector or equivalent means, that is, of a frequency which is about the chip rate is inputted to the sliding correlator. The sliding correlator needs chip synchronization and has drawbacks that it takes time to capture synchronization and that the reception signal including carrier components cannot be inputted to the sliding correlator.

In the SAW matched filter, chip synchronization can be obtained at high speed. Although it can be used in the RF and IF bands, there are drawbacks that since the spread code is decided by a physical pattern of an SAW device, it is difficult to change the code and the filter does not easily correspond to a long spread code.

In the digital LSI matched filter, the chip synchronization is unnecessary. Although there is an advantage that the spread code can be easily changed, there is a drawback of a large power consumption. In the digital LSI matched filter according to conventional CMOS integrated circuit techniques, since the operating speed is slow, there is a drawback that it can be generally used only in the baseband.

In recent years, a mobile communication (portable telephone and the like) is being widely spread. As a communication system employed by the mobile communication, attention has been paid most to the above-mentioned CDMA. The correlator of the CDMA used in the mobile communication is requested to have programmability of the spread code and small power consumption.

However, the SAW matched filter has a problem regarding the programmability of the spread code. On the other hand, the digital LSI matched filter has a drawback of a large power consumption.

Recently, a correlator using a switched capacitor system has been developed and is being put into practical use. The correlator is accomplished by further improving the digital LSI matched filter and has power consumption of about $\frac{1}{10}$ of that of the digital LSI matched filter.

SUMMARY OF THE INVENTION

The invention has been made in consideration of the background and it is an object of the invention to provide a code division multiplex communications system having programmability of the spread code and the power consumption which is markedly smaller than that of the conventional technique.

According to the invention, there is provided a code division multiplex communications system comprising: receiving means for receiving a radio wave and transforming the radio wave to an electric signal; delaying means for sequentially reading the electric signal at a timing of a clock pulse; switching means for shutting off a drive current of the delaying means at an OFF timing of the clock pulse; adding and subtracting means for adding and subtracting outputs of the delaying means in accordance with a spread code; and reproducing means for reproducing a transmission signal on the basis of an output of the adding and subtracting means.

Preferably, in the code division multiplex communications system, the receiving means receives the radio wave and transforming the received signal to an intermediate frequency signal.

Preferably, in the code division multiplex communications system, the receiving means receives the radio wave and transforms the received radio wave to a baseband signal.

Preferably, in the code division multiplex communications system, the delaying means has voltage-current converting means and current delaying means, converts the electric signal to a current signal, and after that, sequentially reads the current signal by the current delaying means at the timing of the clock pulse.

Preferably, in the code division multiplex communications system, the current delaying means is constructed by current flip-flops of the number twice as many as the number of chips of the spread code.

Preferably, in the code division multiplex communications system, the current flip-flop is constructed by serially connecting a first sample and hold circuit for sampling an input current at the leading edge of a first clock pulse and holding at the trailing edge of the first clock pulse and a second sample and hold circuit for sampling an input current at the leading edge of a second clock pulse and holding at the trailing edge of the second clock pulse.

Preferably, in the code division multiplex communications system, the adding and subtracting means comprises: spread code output means for outputting a spread code; switching means for connecting each output of the current delaying means to a first or second current path to perform current addition on the basis of the output of the spread code output means; and subtracting means for subtracting the current of the second current path from the current of the first current path.

Preferably, in the code division multiplex communications system, the adding and subtracting means comprises: spread code output means for outputting the spread code; adding means for connecting outputs of the current delaying means to the first or second current path on the basis of an output of the spread code output means and adding currents; subtracting means for subtracting a current of the second current path from a current of the first current path; and switching means for turning off the operation of the adding means and subtracting means at an OFF timing of the clock pulse.

Preferably, in the code division multiplex communications system, in the subtracting means, first and second current mirror circuits are connected in series, a current of the second current path is supplied to an input terminal of the first current mirror circuit, a current of the first current path is supplied to an output terminal of the first current mirror circuit and an input terminal of the second current mirror circuit, and an output is obtained from an output terminal of the second current mirror circuit.

Preferably, in the code division multiplex communications system, the reproduction means comprises: a current-voltage converter for converting an output of the adding and subtracting means to a voltage signal; and a demodulator for reproducing the transmission signal by integrating an output of the current-voltage converter.

BRIEF DESCRIPTION OF THE DRAWINGS

FIGS. 8A, 8B, and 8C are timing diagrams showing the operation of the code division multiplex communications system according to the embodiment of the invention;

FIGS. 9A, 9B, 9C, 9D and 9E are timing diagrams showing a transmission wave of a spread spectrum communication;

FIGS. 10A, 10B, 10C, 10D, 10E, 10F and 10G are timing diagrams showing the operation of the CDF/F in FIG. 4;

DETAILED DESCRIPTION OF THE PREFERRED EMBODIMENTS (1) Description of the Embodiments An embodiment of the invention will be described hereinbelow with reference to the drawings. FIG. 2 is a block diagram showing the construction of a code division multiplex communications system (receiving side) according to an embodiment of the invention. In the diagram, reference numeral 1 denotes an antenna for receiving waves transmitted from a transmitter which will be described hereinafter; 2 a mixer for mixing the received transmission wave and a signal outputted from a local oscillator 3 and generating an IF (intermediate frequency) signal; and 4 a carrier synchronization detector for detecting synchronization of the outputs of the mixer 2. As a spread code, a PN (Pseudo random Noise) code is used. Reference numeral 5 denotes a correlator for obtaining the correlation between the PN code generated by a PN code generator 6 and the output of the carrier sync detector 4 and generating a correlation signal; and 7 a demodulator constructed by using an integrator and the like for demodulating baseband data on the basis of the output of the correlator 5.

The construction of the correlator 5 shown in FIG. 2 will be explained with reference to FIG. 1. The correlator 5 is different from a conventional correlator, uses a switched current method (switched current matched filter), and detects the correlation by current addition. In FIG. 1, reference numeral 101 denotes a V/IC (Voltage/Current Converter) for converting a voltage value of a signal Vin inputted from a terminal T1 to a current value Iin and outputting the current value Iin from a terminal T2.

FIG. 3 is a diagram showing a construction example of the V/IC 101 in FIG. 1. In FIG. 3, OP1 denotes an operational amplifier for amplifying the voltage difference between the (−) terminal and the (+) terminal. The (+) terminal is connected to the terminal T1 and the (−) terminal is connected to the ground via a resistor R1. M15 shows an n-channel type MOS transistor which converts a voltage to a current and whose source is connected to the ground via the resistor R1. Its drain is connected to the terminal T2 and its gate is connected to an output terminal of the operational amplifier OP1. This construction relates to a so-called sink type V/I converter. A so-called source type V/I converter may be also used.

In FIG. 1, $102_1, 102_2, \ldots, 102_n$ (n is a natural number) denote CDF/Fs (Current Delay Flip/Flops) which sample and temporarily hold currents inputted from terminals $T6_1$ to $T6_n$ at timings of clock pulses inputted to terminals $T7_1$ to $T7_n$ and output from terminals $T9_1$ to $T9_n$ and terminals $T10_1$ to $T10_n$ at timings of clock pulses inputted to terminals $T8_1$ to $T8_n$.

FIG. 4 is a diagram showing an example of the construction of the CDF/F $102_1$ in FIG. 1 (each of the CDF/Fs $102_2$ to $102_n$ has the same construction). The CDF/F $102_1$ is constructed by sample and hold circuits SH1 and SH2 for holding current. In the sample and hold circuit SH1, M1 denotes an n-type MOS transistor whose source is connected to the ground. Its drain is connected to a power source Vdd via a constant current source A1, its gate is connected to the drain, and the source is connected to the ground via an MOS transistor M2.

Similarly, M3 is an n-type MOS transistor whose source is connected to the ground. Its drain is connected to the power source Vdd via a constant current source A2, its gate is connected to the gate of the MOS transistor M1 via a switch SW1 and its source is connected to the ground via an MOS transistor M4.

The n-type MOS transistor is a so-called n-channel MOSFET. A p-type MOS transistor denotes a p-channel MOSFET. Each of those n-type MOS transistor and the p-type MOS transistor is an enhancement-type MOSFET in which a current hardly flows in the drain/source when a voltage is not applied to the gate. Although a depletion type MOSFET in which a current flows in the drain/source when no voltage is applied to the gate can be also used, there is a drawback that its performance cannot obtain the operation characteristics shown in the embodiment.

Figure 4:
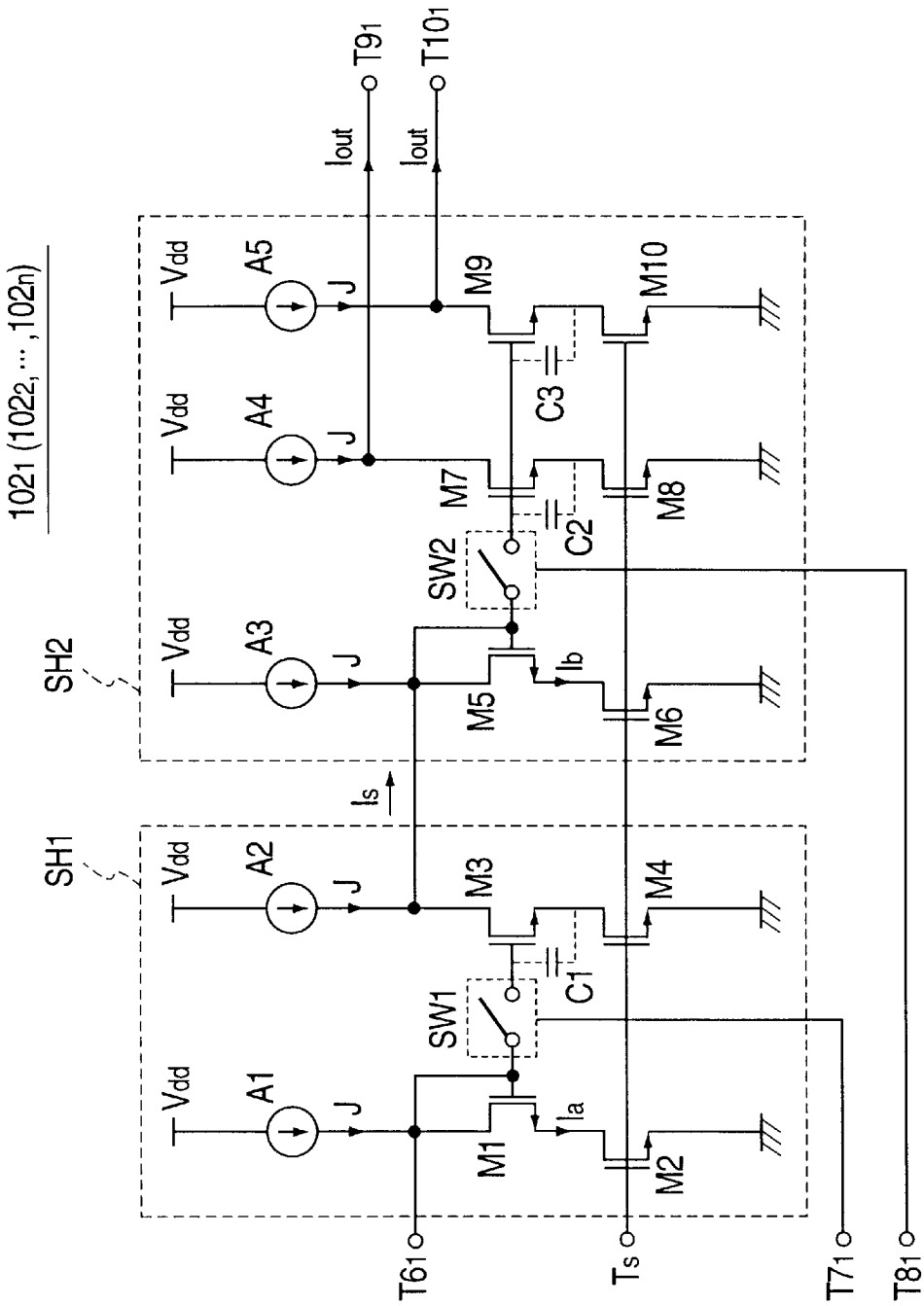
FIG. 4 is a circuit diagram showing the construction of a CDF/F $102_1$ in FIG. 1.

As a fundamental construction, in one sample and hold circuit, that is, in SH1 in FIG. 4, current values of the current sources of A1 and A2 are the same. The "ratio of the gate width to the gate length" in the n-channel MOS transistor M1 and that of M3 in SH1 are the same. In SH2 in FIG. 4, the current values of current sources of A3, A4, and A5 are the same. The "ratio of the gate width to the gate length" in each of n-channel MOS transistors M5, M7, and M9 in SH2 is the same. Consequently, an absolute value of the input current Iin of SH1 and that of an output current Is of SH1 are equal. An input current Is in SH2, an output current (Iout) from $T9_1$, and an output current from $T10_1$ are also equal.

Each of switches SW1 and SW2 in FIG. 4 can be constructed by the n-type MOS transistor. When the power source voltage Vdd is applied to the gate, the drain/source of the n-type MOS transistor are made conductive and the on-state is obtained. When the gate voltage is zero, the source/drain are in a shut-off state and the off-state is obtained. Similarly, each of switches SW11, SW12, SW21, and SW22 in FIG. 11 which will be described hereinafter can be constructed by the n-type MOS transistor.

When the current values in a single CDF/F are equal as mentioned above, (n) CDF/Fs can be constructed by the same circuits, so that circuit designing is facilitated. Current values of the current sources and the "ratio of the gate width to the gate length" of each MOS transistor may be deliberately changed. In this case, since the input and output currents in SH1 and SH2 are changed according to the current values of the current sources and "the ratio of the gate width to the gate length" of the MOS transistor, the circuit designing is complicated.

The "ratio of the gate width to the gate length" of each of the n-channel type MOS transistors M2, M4, M6, M8, and M10 does not have to be the same. However, since those MOS transistors are used as switches, in order to obtain the same on-resistance when they are conductive, it is preferable that the MOS transistors have the same "ratio of the gate width to the gate length".

The switch SW1 is constructed by an MOS transistor and is turned on when a clock pulse W1 inputted from the terminal $T7_1$ is "1" and is turned off when the clock pulse W1 is "0". C1 denotes a parasitic capacitance between the gate and source of the n-type MOS transistor M3.

When the clock pulse is "1", specifically, the voltage Vdd is applied. When the clockpulse is "0", potential is zero. Assuming now that SW1 and SW2 are constructed by the n-type MOS transistors, when the clock pulse is "1", SW1 is ON and when the clock pulse is "0", SW2 is OFF.

In the construction of the sample and hold circuit SH2, M5 denotes an n-type MOS transistor whose source is connected to the ground. Its drain is connected to the power source Vdd via the constant current source A3, its gate is connected to the drain, and the source is connected to the ground via an MOS transistor M6. M7 denotes the n-type MOS transistor whose source is connected to the ground. Its drain is connected to the power source Vdd via the constant current source A4, its gate is connected to the gate of the MOS transistor M5 via the switch SW2, and the source is connected to the ground via an MOS transistor M8. Similarly, M9 denotes the n-type MOS transistor whose source is connected to the ground. Its drain is connected to the power source Vdd via the constant current source A5, its gate is connected to the gate of the MOS transistor M7, and the source is connected to the ground via an MOS transistor M10.

The switch SW2 is turned on when a clock pulse W2 inputted from the terminal $T8_1$ is "1" and is turned off when the signal W2 is "0". The switch SW2 is constructed by an MOS transistor. C2 indicates a parasitic capacitance between the gate and the source of the MOS transistor M7 and C3 denotes a parasitic capacitance between the gate and the source of the MOS transistor M8.

The drain of the n-type MOS transistor M7 is connected to the terminal $T9_1$ and the drain of the n-type MOS transistor M9 is connected to the terminal $T10_1$. The drain of the n-type MOS transistor M3 and the drain of the n-type MOS transistor M5 are connected. The gates of the MOS transistors M2, M4, M6, M8, and M10 are commonly connected to a terminal Ts.

Figure 1:
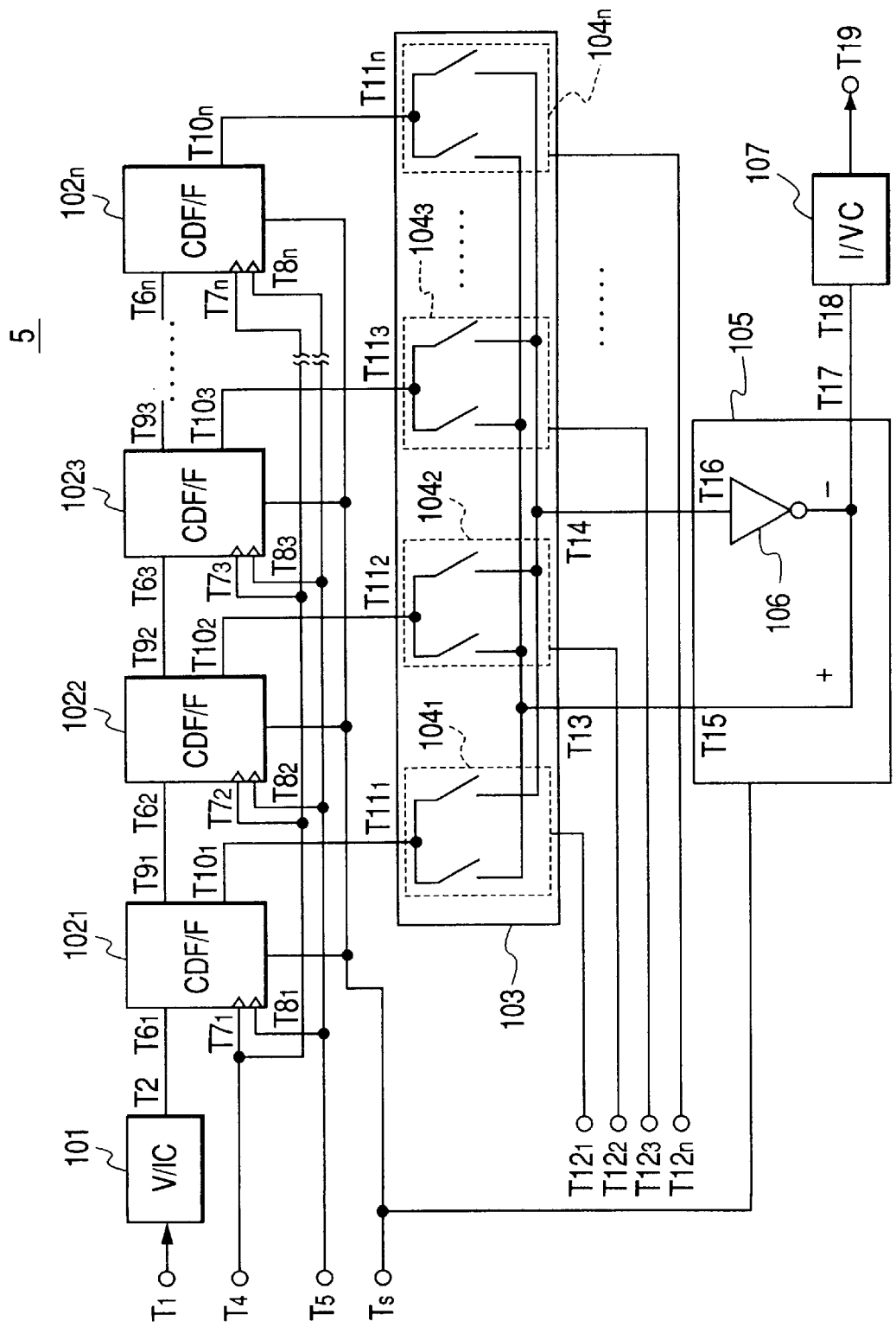
FIG. 1 is a block diagram showing the construction of a correlator according to an embodiment of the invention.

Reference numeral 103 in FIG. 1 denotes a switch circuit for switching current paths inputted to terminal $T11_1$ to $T11_n$ to a terminal T13 or T14 by signals inputted from terminals $T12_1$ to $T12_n$. The switch circuit 103 is constructed by analog switches $104_1$, $104_2$, . . . , $104_n$. PN codes generated by the PN code generator 6 (FIG. 2) are applied to the terminals T121 to T12n.

Figure 5:
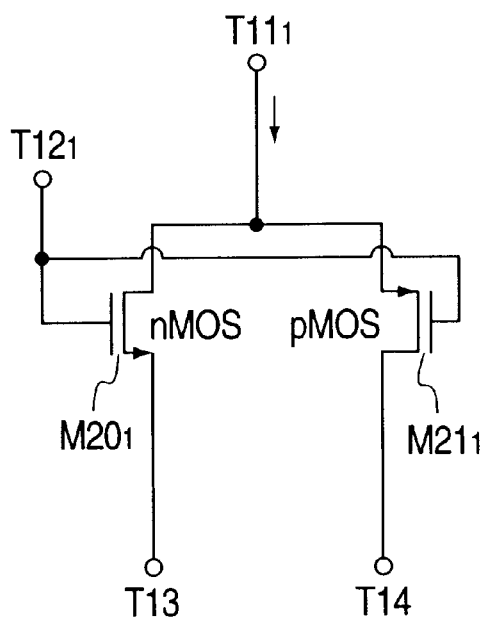
FIG. 5 is a circuit diagram showing the construction of an analog switch $104_1$ in FIG. 1.

FIG. 5 is a diagram showing the construction of the analog switch $104_1$ (each of $104_2$ to $104_n$ has the same construction) in FIG. 1. In FIG. 5, $M20_1$ denotes an n-type MOS transistor. Its drain is connected to the terminal $T11_1$, its source is connected to a terminal $T13_1$, and its gate is connected to the terminal $T12_1$. $M21_1$ indicates a p-type MOS transistor. Its drain is connected to the terminal $T11_1$, its source is connected to a terminal $T14_1$, and its gate is connected to the terminal $T12_1$.

Outputs $T13_1$ to $T13_n$ of the analog switches are commonly connected to T13 in FIG. 1. Outputs $T14_1$ to $T14_n$ of the analog switches are commonly connected to T14 in FIG. 1.

Reference numeral 105 in FIG. 1 denotes a current adder for adding a current flowing in a terminal T15 and a current obtained by inverting a current flowing in a terminal T16 by an inverting means 106 and outputting the result of addition to an output terminal T17. In other words, the current flowing in the terminal T16 is subtracted from the current flowing in the terminal T15 and the result is outputted to the output terminal T17.

Figure 6A:
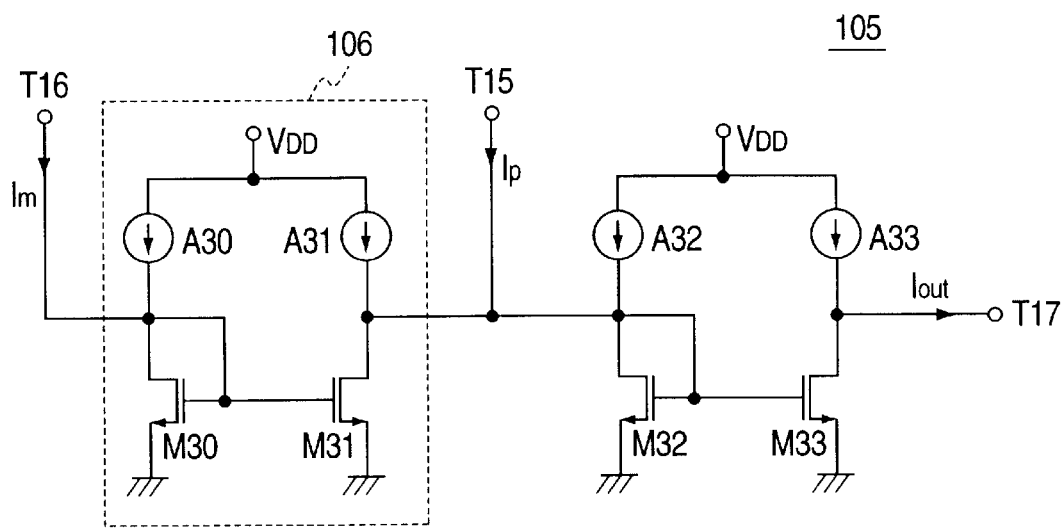
FIGS. 6A and 6B are circuit diagrams the construction of a current adder 105 in FIG. 1.

FIG. 6A is a diagram showing an example of the construction of the current adder 105 in FIG. 1. In FIG. 6A, M30 denotes an n-type MOS transistor whose source is connected to the ground. The drain is connected to the power source Vdd via a constant current source A30 and is connected to the terminal T16. The gate is connected to the drain and the source is connected to the ground. M31 denotes an n-type MOS transistor whose source is connected to the ground. Its drain is connected to the power source Vdd via a constant current source A31 and is connected to the terminal T15. Its gate is connected to the gate of the MOS transistor M30 and the source is connected to the ground.

M32 denotes an n-type MOS transistor whose source is connected to the ground. Its drain is connected to the power source Vdd via a constant current source A32 and is connected to the terminal T15. Its gate is connected to the drain and the source is connected to the ground. M33 indicates an n-type MOS transistor whose source is connected to the ground. Its drain is connected to the power source Vdd via a constant current source A33 and to the terminal T17. Its gate is connected to the gate of the n-type MOS transistor M32 and its source is connected to the ground. The current values of the constant current sources A30 to A33 are the same. The circuit constructed by the MOS transistors M30, M31 and the constant current sources A30, A31, and the circuit constructed by the MOS transistors M32, M33 and the constant current sources A32, A33 are current mirror circuits.

In a fundamental construction, the current values of the current sources A30 and A31 are equal and the "ratio of the gate width to the gate length" of the MOS transistor M30 and that of M31 are equal. Similarly, the current values of the current sources A32 and A33 are equal and the "ratio of the gate width to the gate length" of the MOS transistor M32 and that of M33 are equal. With such a construction, the following operation is performed.

In the construction, assuming now that a current flowing from the terminal T16 is Im, a current flowing from the terminal T15 to the MOS transistor M31 is also Im. As a result, when it is assumed that the full current flowing from the terminal T15 is Ip, a current flowing from the terminal T15 to the MOS transistor M32 is (Ip−Im), and a current Iout flowing from the output terminal T17 to the outside is −(Ip−Im).

When the current values of the current sources A30 and A31, the "ratio of the gate width to the gate length" of the MOS transistor M30 and that of M31, the current values of the current sources A32 and A33, and the "ratio of the gate width to the gate length" of the MOS transistor M32 and that of M33 are not equal respectively, an output current is generally "−($\alpha$Ip−$\beta$Im)". $\alpha$ and $\beta$ are values determined by the current values and the "ratio of the gate width to the gate length" of each MOS transistor.

Figure 6B:
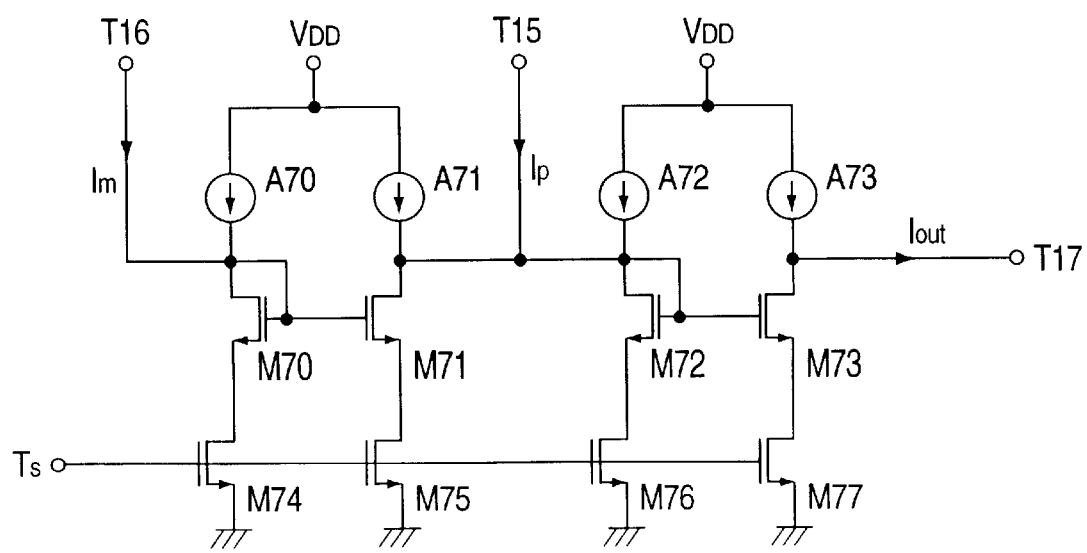

FIG. 6B is a diagram showing another example of the construction of the current adder 105. In FIG. 6B, M70 denotes an n-type MOS transistor. Its drain is connected to the power source Vdd via a constant current source A70 and also to the terminal T16, its gate is connected to the drain, and the source is connected to the ground via an MOS transistor M74.

M71 denotes an n-type MOS transistor. Its drain is connected to the power source Vdd via a constant current source A71 and also to the terminal T15, its gate is connected to the gate of the MOS transistor M70, and the source is connected to the ground via an MOS transistor M75.

M72 indicates an n-type MOS transistor. Its drain is connected to the power source Vdd via a constant current source A72 and also to the terminal T15, its gate is connected to the drain, and its source is connected to the ground via an MOS transistor M76.

M73 indicates an n-type MOS transistor. Its drain is connected to the power source Vdd via a constant current source A73 and also to the terminal T17, its gate is connected to the gate of the MOS transistor M72, and its source is connected to a transistor M77.

M74, M75, M76, and M77 are the MOS transistors and the gates are connected to the terminal Ts. Those MOS transistors M74, M75, M76, and M77 are of the n-type. When a voltage higher than (a threshold value voltage of the MOS transistor—the earth voltage) is applied to the gate, the transistors are turned on.

The current values of the constant current sources A70 to A73 are set to be equal. The circuit constructed by the MOS transistors M70, M71, M74, and M75 and the constant current sources A70 and A71 and the circuit constructed by the MOS transistors M72, M73, M76, and M77 and the constant current sources A72 and A73 are current mirror circuits when the MOS transistors M74, M75, M76, and M77 are "on", that is, in a conductive state.

In a fundamental construction, it is set so that the current values of the current sources A70 and A71 are equal and the "ratio of the gate width to the gate length" of the MOS transistor M70 and that of M71 are equal. Similarly, the current values of the current sources A72 and A73 are equal and the "ratio of the gate width to the gate length" of the MOS transistor M72 and that of M73 are equal. With such a construction, the following operation is performed.

In the construction, assuming now that a current flowing from the terminal T16 is Im, a current flowing from the terminal T15 to the MOS transistor M71 is also Im. As a result, when it is assumed that the full current flowing from the terminal T15 is Ip, a current flowing from the terminal T15 to the MOS transistor M72 is (Ip−Im), and a current Iout flowing from the output terminal T17 to the outside is accordingly −(Ip−Im).

When the current values of the current sources A70 and A71, the "ratio of the gate width to the gate length" of the MOS transistor M70 and that of M71, the current values of the current sources A72 and A73, and the "ratio of the gate width to the gate length" of the MOS transistor M72 and that of M73 are not equal, an output current is generally −($\alpha$Ip−$\beta$Im). $\alpha$ and $\beta$ are values determined by the current values and the "ratio of the gate width to the gate length" of each MOS transistor.

It is preferable that the "ratio of the gate width to the gate length" of each of the MOS transistors M74, M75, M76, and M77 is the same so as to have the same ON resistance.

Figure 7:
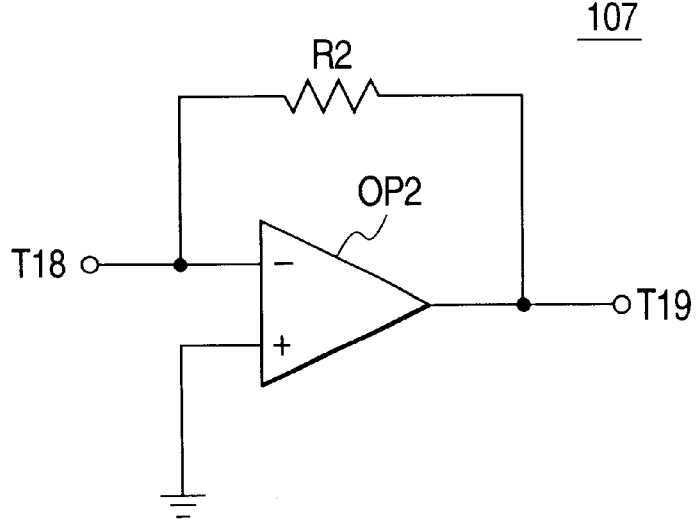
FIG. 7 is a circuit diagram showing the construction of a I/VC 107 in FIG. 1.

Reference numeral 107 in FIG. 1 denotes an I/VC (Current/Voltage Converter) for converting a current value inputted from the terminal T18 to a voltage value and outputting the voltage value from the terminal T19. FIG. 7 is a diagram showing an example of the construction of the I/VC 107. In FIG. 7, OP2 denotes an operational amplifier and R2 indicates a resistor interposed between the (−) terminal and the output terminal of the operational amplifier OP2.

Figure 15A:
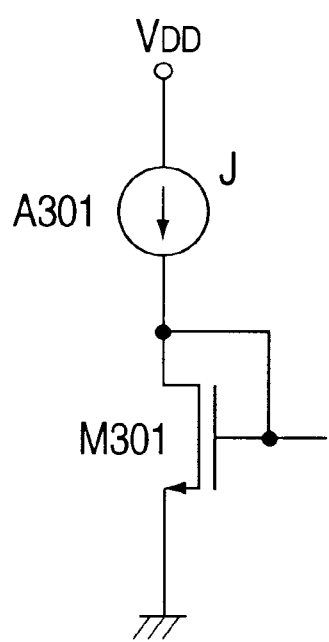
FIGS. 15A and 15B are diagram specifically showing the construction of a current source in the embodiment.

In the above description, circuit codes are used as current sources. In an actual circuit, a current source having the construction shown in FIGS. 15A and 15B can be used. FIG. 15A shows a circuit portion including the current source in FIGS. 4, 6A, 6B, and 11. In FIG. 15A, M301 denotes an n-type MOS transistor in which the source is connected to the ground, the gate and the drain are connected, and the drain is connected to the power source Vdd via a current source A301.

Figure 15B:
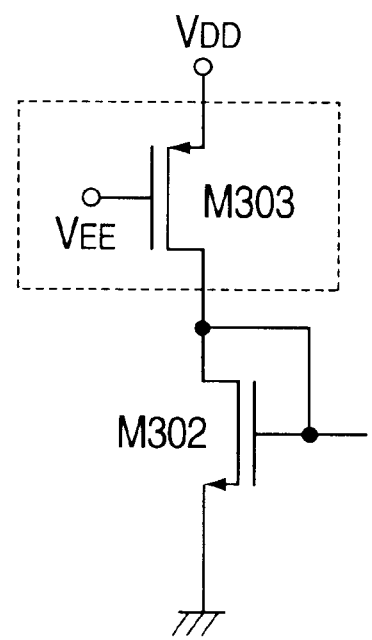

FIG. 15B is a diagram showing a specific circuit of the current source A301 shown in FIG. 15A. In FIG. 15B, M302 denotes an n-type MOS transistor having the same construction as that of the MOS transistor M301 shown in FIG. 15A. M303 indicates a p-type MOS transistor in which the drain is connected to the drain of M302 and the source is connected to Vdd. With such a construction, when a proper voltage VEE is applied to the gate of M303, the p-type MOS transistor M303 operates as a current source. A current J of the current source is determined by the "gate length", "ratio of the gate width to the gate length", and the gate voltage of the p-type MOS transistor. After the circuit is constructed, the value of the current J of the current source can be controlled by varying the gate voltage VEE.

The operation of the embodiment will be described hereinbelow. FIG. 8 is a diagram showing a process for demodulating a spread spectrum transmission wave. The antenna 1 in FIG. 2 receives the spread spectrum modulated transmission wave multiplied by a carrier wave. The received transmission wave shown in FIG. 8A will be described with reference to FIG. 9. FIG. 9 is a waveform chart for explaining the spread spectrum modulating process.

A data packet shown in FIG. 9 consists of 128 chips. In case of transmitting baseband data "1" shown in FIG. 9A, a PN code shown in FIG. 9B and the baseband data "1" are multiplied. The PN code denotes a pseudo noise code. As the PN code, the m-series code, Gold code, orthogonal m-series code, orthogonal Gold code, orthogonal code formed from the Walsh function, and the like are known. Especially, the orthogonal code has the following characteristics. In the autocorrelation function, when the phase difference is zero, the correlation value is maximum. In the cross correlation function, when the phase difference is zero, the correlation value is zero. Since the orthogonal code has the characteristic, it can be said that the code is adapted to a channel division in the CDMA. The correlator 5 according to the embodiment can perform a correlating operation to any code by the signals from $T12_1$ to $T12_n$ applied to the switch matrix 103.

By multiplying the signal of FIG. 9C which is spread modulated by the multiplying process with a carrier wave shown in FIG. 9E, the spread spectrum transmission wave shown in FIG. 9D can be obtained.

In case of transmitting, for instance, baseband data "0", the spread modulated data has a waveform of a phase opposite to that of the waveform shown in FIG. 9C. The waveform of the phase opposite to that of FIG. 9C is multiplied by the carrier wave shown in FIG. 9E, thereby forming a transmission wave of data "0".

Figure 2:
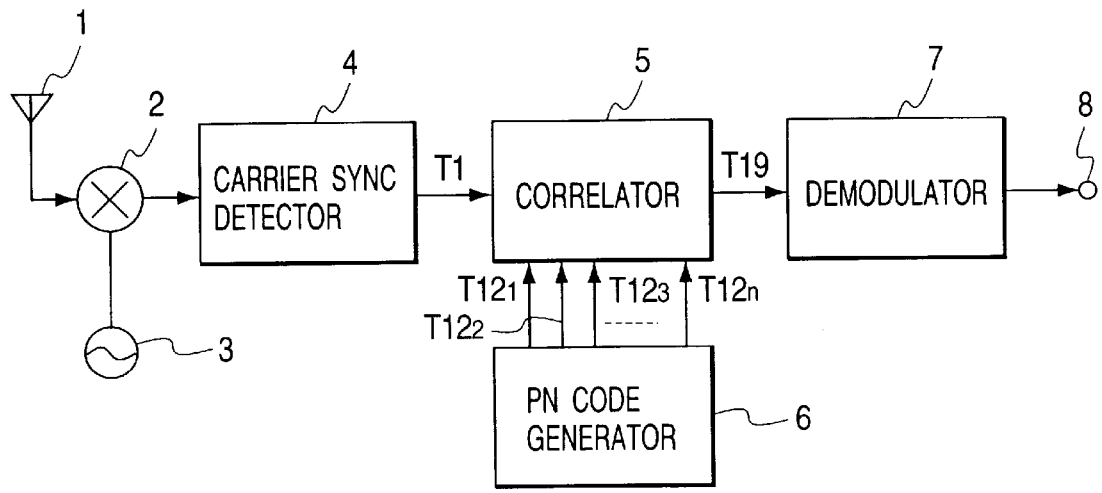
FIG. 2 is a block diagram showing the construction of a code division multiplex communications system according to an embodiment of the invention.
Figure 3:
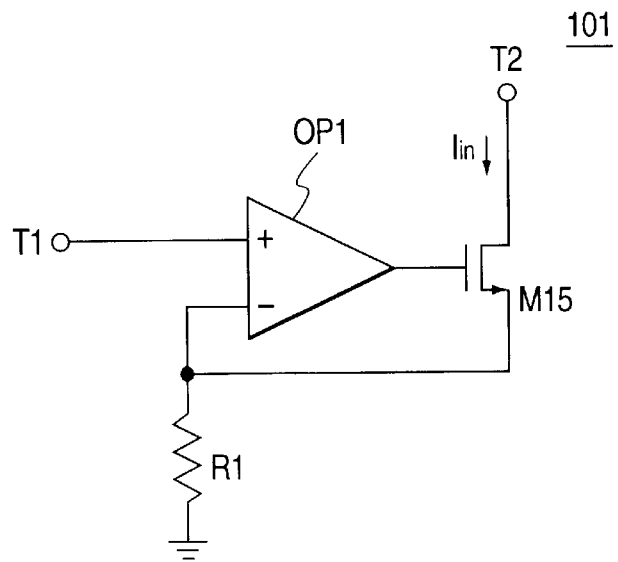
FIG. 3 is a circuit diagram showing the construction of a V/IC 101 in FIG. 1.

The transmission wave shown in FIG. 8A inputted from the antenna 1 in FIG. 2 is mixed with a signal of a frequency generated by the local oscillator 3 in the mixer 2, thereby obtaining the IF (intermediate frequency) signal which has the frequency equal to the difference between the carrier wave and the signal. The IF signal is detected by the carrier sync detector 4 and is converted to a signal based on the PN code shown in FIG. 9B and the baseband data. The correlator 5 obtains the correlation between the output signal of the carrier sync detector 4 and the PN code generated by the PN code generator 6. The PN code generated by the PN code generator 6 and the PN code in the above-mentioned transmission are the same.

The operation of the correlator 5 shown in FIG. 1 will be described in detail. The spread modulated data (refer to FIG. 8B) outputted from the carrier sync detector 4 is inputted from the terminal T1 to the V/IC 101, converted to a current by the V/IC 101, and the current is sequentially supplied to the CDF/F $102_1$. The current data outputted from the V/IC 101 is read while being sequentially shifted by the CDF/F $102_1$ to CDF/F $102_n$ on the basis of the clock pulses W1 and W2.

The operation of the CDF/Fs $102_1$ to $102_n$ will be described in detail with reference to FIGS. 4 and 10. FIG. 10 shows an example of a timing chart showing the operation of the CDF/F $102_1$.

The clock pulse W1 shown in FIG. 10A and the clock pulse W2 shown in FIG. 10B have the same period and duty ratio. The phases of them are deviated by an amount corresponding to "ON" time of the clock pulse W1. When either one of the clock pulses W1 and W2 is in the "1" state, a signal WS shown in FIG. 10C is in the "1" state. The signal WS is applied to the terminal Ts in FIG. 4. Consequently, when the signal WS is "1", the MOS transistors M2, M4, M6, M8, and M10 are turned "ON".

When the signal WS becomes "1" at a time t1 shown in FIG. 10, all of the MOS transistors M2, M4, M6, M8, and M10 are turned on and the circuit of FIG. 4 enters an enable state. It is assumed that the current flowing from the V/IC 101 to the CDF/F $102_1$ at this time point is Iin (refer to FIG. 10D). The current Iin is supplied from the terminal $T6_1$ to the drain of the MOS transistor M1. When each of the current values of the constant current sources A1 to A5 is equal to J, the current value Ia flowing in the MOS transistor M1 is equal to (J+Iin) (refer to FIG. 10D).

When the clock pulse W1 shown in FIG. 10A becomes "1" at this time, the switch SW1 (FIG. 4) is closed, thereby short-circuiting the gate of the MOS transistor M1 and the gate of the MOS transistor M3. The switch SW2 is open at this time, so that the gate of the MOS transistor M5 and the gates of the MOS transistors M7 and M9 are electrically disconnected.

When the switch SW1 is "ON", the MOS transistors M1 and M3 construct a current mirror circuit and the current (J+Iin) which is the same as that flows in the MOS transistor M1 flows in the MOS transistor M3. Consequently, the current Is (refer to FIG. 4) flowing from the drain side of the MOS transistor M3 to the drain side of the MOS transistor M5 is equal to −Iin and the current Ib in the MOS transistor M5 is (J−Iin) (refer to FIG. 10F). The parasitic capacitance C1 between the gate and the source of the MOS transistor M3 is charged at this time. The above-mentioned steps relate to steps of current sampling.

When the clock pulse W1 becomes "0" and the clock pulse W2 becomes "1" at a time t2, the switch SW1 is opened and the gate of the MOS transistor M1 and the gate of the MOS transistor M3 are disconnected. In this instance, the current in the MOS transistor M3 is held by the parasitic capacitance C1 and the value of the current Is is accordingly held at −Iin. This is the current holding step.

On the other hand, when the switch SW2 is closed at the time t2, the gate of the MOS transistor M5 and the gates of the MOS transistors M7 and M9 are short-circuited. Consequently, the currents flowing in the MOS transistors M7 and M9 are equal to (J−Iin) which is the same current as that flows in the MOS transistor M5. As a result, the current Iout (FIG. 4) is equal to the current Iin as shown in FIG. 10G and the current Iin is out putted from the terminal $T9_1$. The current outputted from the terminal $T10_1$ is the same.

At this time, parasitic capacitance C2 between the gate and the source of the MOS transistor M7 and the parasitic capacitance C3 between the gate and the source of the MOS transistor M9 are charged.

When the clock pulse W2 becomes "0" at a time t3, the switch SW2 is "OFF" and the output current Iout is held by the parasitic capacitance C2. The signal WS becomes "0" at this point, and after that, the circuit of FIG. 4 enters a disable state. When the signal WS becomes "1" again at a time t4, the circuit is in the enable state and operation similar to the above is restarted. While the circuit is in the disable state, by the gate parasitic capacitance of each of the MOS transistors M1, M3, M5, M7, and M9, the operation can be restarted at the time t4 in the same state as that of time t3.

The sampling and holding processes are sequentially executed, so that the current values corresponding to chip values of the PN code inputted to the terminal T1 are sequentially set in the CDF/Fs $102_1$ to $102_n$.

The currents outputted from the CDF/Fs $102_1$ to $102_n$ are collected in the terminal T15 or T16 of the current adder 105 by the switch circuit 103. That is, the currents are added.

Assuming now that the number of CDF/Fs is 10 and the PN code is "1111110000", the output currents of the CDF/Fs $102_1$ to $102_6$ flow in the terminal T15 via the switch circuit 103 and the output currents of the CDF/Fs $102_7$ to $102_{10}$ flow in the terminal T16 via the switch circuit 103.

The current of the sum of the output currents of the CDF/Fs $102_1$ to $102_6$ flows in the terminal T15 and the current of the sum of the output currents of the CDF/Fs $102_7$ to $102_{10}$ flows in the terminal T16.

The current from the terminal T15 and the current obtained by inverting the current from the terminal T16 are added by the current adder 105 and the result is outputted from the terminal T17. According to the example, when the current data "1111110000" which is the same as that of the PN code is set in the CDF/Fs $102_1$ to $102_{10}$, the output current of the current adder 105 reaches a peak value (refer to FIG. 8C). Thus, a peak voltage is outputted from the I/VC 107.

The correlator 5 in FIG. 1 outputs a positive peak value when the data of the same phase as that of the PN code generated from the PN code generator 6 (FIG. 2) is set in the CDF/Fs $102_1$ to $102_n$. The correlator 5 outputs a negative peak value when the data of the opposite phase is set. That is, the positive peak is outputted when the PN spread modulated baseband data "1" is received by the CDF/Fs $102_1$ to $102_n$ and the negative peak is outputted when the baseband data "0" is received. The peak value is integrated by the demodulator 7 (FIG. 2), thereby obtaining the original baseband data.

(2) Another Embodiment

Figure 11:
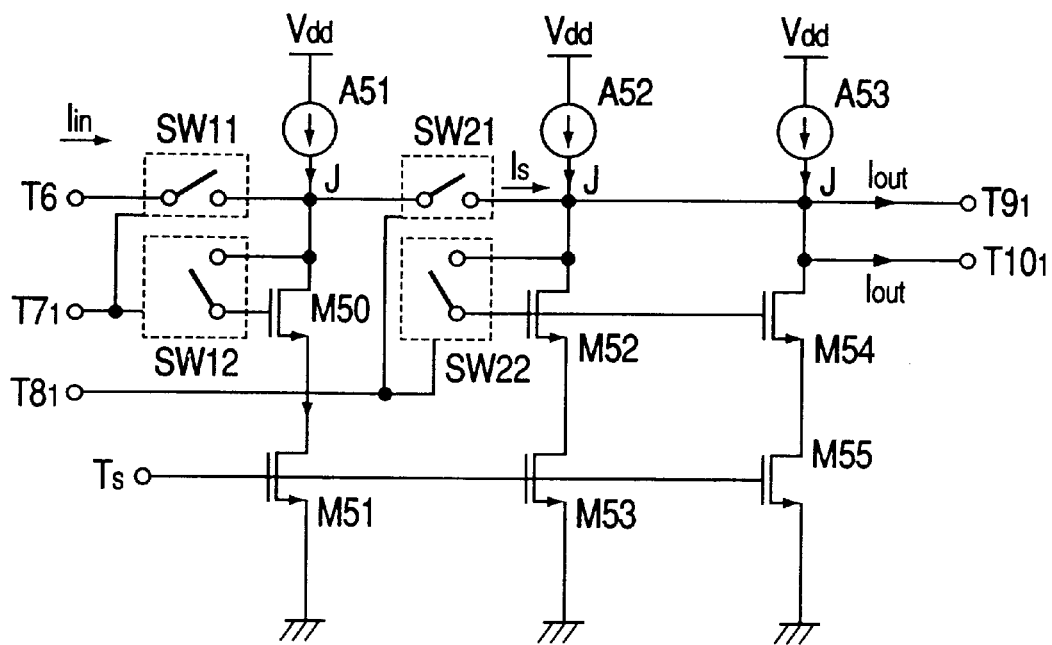
FIG. 11 is a circuit diagram showing another construction of the CDF/F in FIG. 1.

FIG. 11 is a circuit diagram showing another construction example of the CDF/Fs $102_1$ to $102_n$ in FIG. 1. In FIG. 11, M50 denotes an n-type MOS transistor in which the drain is connected to the power source Vdd via the constant current source A51, the gate is connected to the drain via the switch SW12, and the source is connected to the ground via the MOS transistor M51. The drain of the n-type MOS transistor M50 is connected to the terminal $T6_1$ via the switch SW11.

M52 denotes an n-type MOS transistor in which the drain is connected to the power source Vdd via the constant current source A52, the gate is connected to the drain via the switch SW22, and the source is connected to the ground via the MOS transistor M53. The drain of the n-type MOS transistor M52 is connected to the drain of the n-type MOS transistor M50 and to the terminal $T9_1$ via the switch SW21.

M54 denotes an n-type MOS transistor in which the drain is connected to the power source Vdd via the constant current source A3, the gate is connected to the gate of the n-type MOS transistor M52, and the source is connected to the ground via the MOS transistor M55. The drain of the n-type MOS transistor M54 is connected to the terminal $T10_1$. The gates of the MOS transistors M51, M53, and M55 are connected to the terminal Ts.

Figures 14A, 14B, 14C, 14D, 14E, 14F:
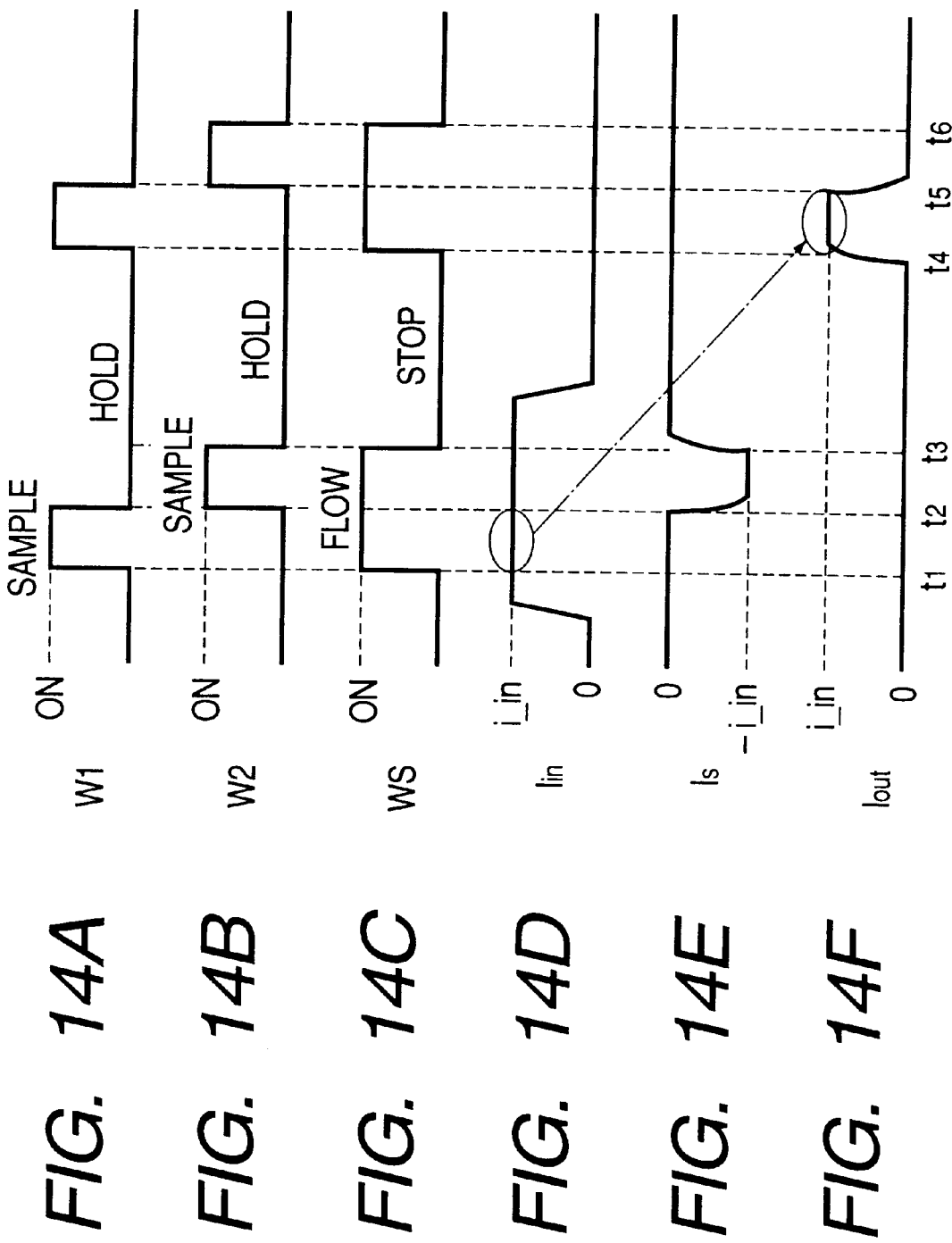
FIGS. 14A, 14B, 14C, 14D, 14E and 14F are timing diagrams showing the operation of the CDF/F shown in FIG. 11.

The operation of the CDF/F shown in FIG. 11 will be described with reference to FIG. 14. It is assumed that the current in each of the constant current sources A51 to A53 is J. When the signal WS shown in FIG. 14C becomes "1" at a time t1, the MOS transistors M51, M53, and M55 are turned on, and the circuit of FIG. 11 enters an enable state. When the clock pulse W1 shown in FIG. 14A simultaneously becomes "1" at this time, the switches SW11 and SW12 are closed and the current Iin inputted from the terminal $T6_1$ is supplied to the drain of the n-type MOS transistor M50.

The current flowing in the n-type MOS transistor M50 is equal to (J+Iin) which is the sum of the current supplied from the constant current source A51 and the current Iin.

When the clock pulse W1 becomes "0" and the clock pulse W2 becomes "1" at a time t2, the switches SW11 and SW12 are opened and the switches SW21 and SW22 are closed.

The current of the n-type MOS transistor M50 is held at (J+Iin) by the parasitic capacitance of the gate/source of the n-type MOS transistor M50. The current Is is accordingly −Iin. As a result, the current in the n-type MOS transistor M52 is (J−Iin). Similarly, the current of the n-type MOS transistor M54 is (J−Iin).

When the clock pulse W2 becomes "0" at a time t3, the switches SW21 and SW22 are opened.

The current (J−Iin) of the MOS transistor M52 is held by the parasitic capacitance between the gate and the source. As a result, the current Iin flows as the current Iout from the constant current source A52 to the terminal $T9_1$. At this time, similarly, the current Iin flows from the drain of the MOS transistor M54 to the terminal $T10_1$. Simultaneously, the signal WS becomes "0" so that the MOS transistors M51, M53, and M55 are turned off and the circuit of FIG. 11 enters the disable state. Although the state continues until a time t4, by the charges stored in the parasitic capacitance between the gate and the source of each of the MOS transistors M50, M52, and M54, the operation can be restarted at the time t4 in the same state as that at the time t3.

According to the circuit of FIG. 11, the number of constant current sources can be reduced as compared with the circuit of FIG. 4.

Figure 12:
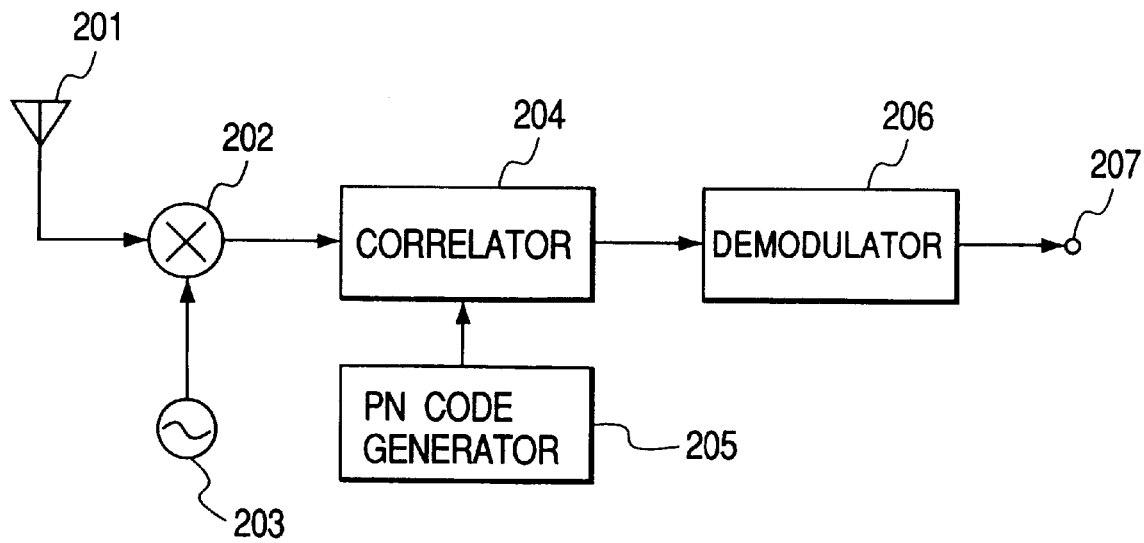
FIG. 12 is a block diagram showing the construction of a code division multiplex communications system according to a second embodiment of the invention.

FIG. 12 is a block diagram showing the construction of a code division multiplex communications system (receiving side) according to another embodiment of the invention. In FIG. 12, reference numeral 201 denotes an antenna for receiving a transmission wave from a transmitter (not shown); 202 a mixer for mixing the received transmission wave and a signal wave oscillated by the local oscillator 3 and outputting an IF signal; 204 a correlator having the construction similar to that of the correlator 5 shown in FIG. 1 for obtaining the correlation between the PN code generated by a programmable PN code generator 205 and the IF signal and outputting a correlation signal; and 206 a demodulator for reproducing a baseband signal on the basis of the inputted correlation signal.

Figures 13A, 13B, 13C, 13D:
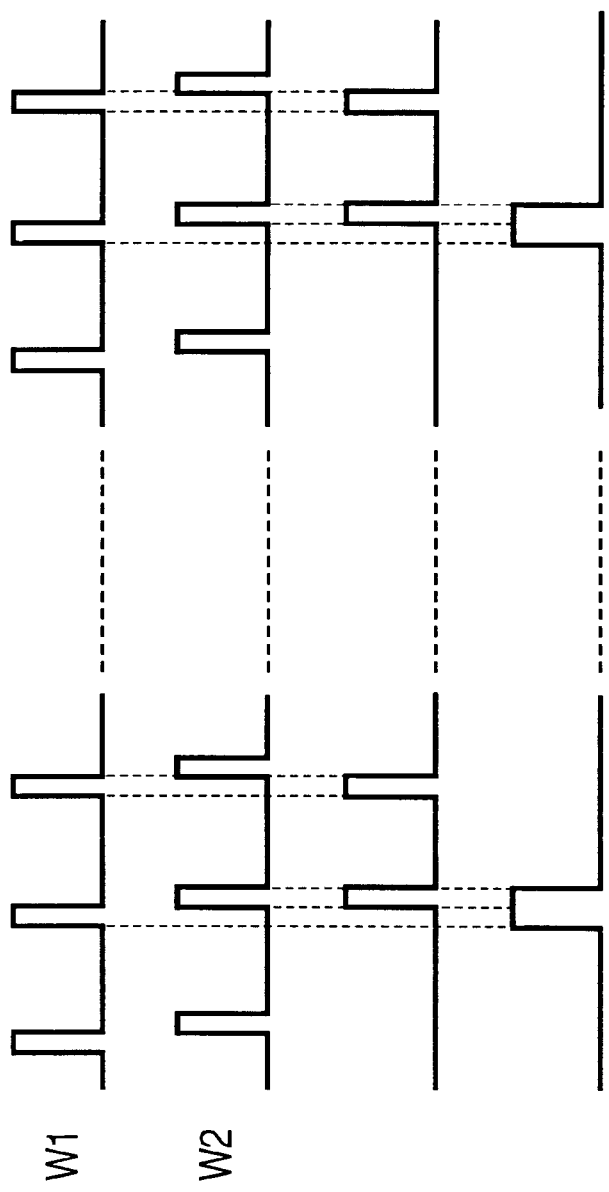
FIGS. 13A, 13B, 13C and 13D are timing diagrams for explaining the operation when the phases of clock pulses W1 and W2 in FIG. 4 are changed.

According to the embodiment, the correlation peak appears in two pulses as shown in FIG. 13C. In order to prevent this, it is sufficient to set so that the clock pulses W1 and W2 have opposite phases and the phase of W2 is advanced more than that of W2. In this case, the correlation peak is as shown in FIG. 13D.

The duty ratios of the clock pulses W1 and W2 are set to the same in the foregoing. If the clock pulse WS is in a state of "J" when the clock pulses W1 and W2 are "1", the operation can be performed even if the duty ratios of the clock pulses W1 and W2 are different to each other.

(3) Effects of the Embodiments

As obviously understood from the above description, in the current adding type correlator 5 according to the embodiment, the circuit is in a disable state per period of the clock pulse, thereby realizing the low power consumption. The effect of the low power consumption will be described hereinbelow.

(a) to (d) relate to cases of the following circuits.

a: a case where the transistors M2, M4, M6, M8, and M10 are eliminated in the circuit of FIG. 4 and the circuit shown in FIG. 6A is used as the current adder 105.

b: a case where the transistors M51, M53, and M55 are eliminated in the circuit of FIG. 11 and the circuit shown in FIG. 6A is used as the current adder 105.

c: a case where the circuit of FIG. 4 is used and the circuit shown in FIG. 6B is used as the current adder 105.

d: a case where the circuit of FIG. 11 is used and the circuit shown in FIG. 6B is used as the current adder 105.

TABLE 1 the case of baseband correlation

| | (a) | (b) | (c) | (d) |
|---|---|---|---|---|
| Chip length | 128 | 128 | 128 | 128 |
| Chip rate | *1 | *2 | 14 Mcps | 14 Mcps |
| Sampling | double | ← | ← | ← |
| Sampling frequency | 28 MHz | ← | ← | ← |
| The number of CDF/Fs | 256 | 256 | 256 | 256 |
| The number of Trs/CDF/Fs | 12 | 10 | 17 | 13 |
| The number of current sources/CDF/Fs | 5 | 3 | 5 | 3 |
| Current per current source of CDF/F | 150 $\mu$A | 150 $\mu$A | 150 $\mu$A | 152 $\mu$A |
| The number of Trs of switch matrix | 512 | 512 | 512 | 512 |
| The number of Trs of current adding circuit | 8 | 8 | 12 | 12 |
| The number of current sources of current adding circuit | 4 | 4 | 4 | 4 |
| Current per current source in the current adding circuit | 2.56 mA | 2.56 mA | 2.56 mA | 2.56 mA |
| Tr total number | 3592 | 3080 | 4876 | 3852 |
| Power of CDF/F | 192.0 mW | 115. mW | 4.3 mW | 2.58 mW |
| Power of current adding circuit | 10.2 mW | 10.2 mW | 0.23 mW | 0.23 mW |
| Total power | 202.2 mW | 125.4 mW | 4.5 mW | 2.8 mW |

(*1, *2): In case of (a) and (b), the total power does not depend on the chip rate.

In Table 1, the sampling is a double sampling. That is, an input signal to a match filter is sampled at a frequency twice as high as the chip rate. Since the double sampling is performed in this case, the number of CDF/Fs is equal to a number of twice as long as the chip length.

In the example of Table 1, since the chip length is 128, the number of CDF/Fs is (2×128=) 256. The number of sampling can be also integer times as many as the number of chips. The operation can be executed even if it is not exactly the integer times.

In the case of the IF band correlation of Table 2, the number of CDF/Fs can be determined as follows. That is, when the IF frequency is fIF, the chip length is N. the chip rate is Cchip, and the sampling coefficient is Ms, the number of CDF/Fs is given by:

The number of CDF/Fs=(N×fIF×Ms)÷Cchip

The sampling coefficient Ms is 2 in case of double sampling.

In the current adding type correlator, the operating speed is controlled by a circuit response time of the CDF/F. The response speed ($\tau$) of the CDF/F is 0.0357 nsec in case of using a 0.2$\mu$m Si process. That is, the maximum operating frequency [fmax=1/(2$\pi\tau$)] is 4.46 GHz. Simulation was made by assuming the ON time of the clock pulses W1 and W2, that is, "t2−t1" and "t3−t2" in FIGS. 10 and 13 are 0.4 nsec which is about 10 times as high as $\tau$.

When used for the correlation of the PN data in Tables 1 and 2 as mentioned above, the power consumption of the correlator of (c) having the transistor for the disable state is largely reduced as compared with the correlator of (a). Similarly, the power consumption of the correlator (d) having the transistor for the disable state is largely reduced as compared with the correlator of (b).

Consequently, the transistors for the disable state are so controlled as to supply the drive current to the CDF/Fs $101_1$ to $101_n$ only at the time of sampling and holding operation of the current of the CDF/Fs $101_1$ to $101_n$, thereby enabling the power consumption of the correlator to be largely reduced.

TABLE 2 the case of IF correlation

| | (a) | (b) | (c) | (d) |
|---|---|---|---|---|
| Chip length | 128 | 128 | 128 | 128 |
| Chip rate | 14 Mcps | 14 Mcps | 14 Mcps | 14 Mcps |
| Sampling | double (140 MHz) | ← | ← | ← |
| Sampling frequency | 280 MHz | ← | ← | ← |
| The number of CDF/Fs | 2560 | 2560 | 2560 | 2560 |
| The number of Trs/CDF/Fs | 10 & 12 | 8 & 10 | 14 & 17 | 10 & 13 |
| The number of current sources/CDF/Fs | 4 & 5 | 2 & 3 | 4 & 5 | 2 & 3 |
| Current per current source of CDF/F | 150 $\mu$A | 150 $\mu$A | 150 $\mu$A | 150 $\mu$A |
| The number of Trs of switch matrix | 512 | 512 | 512 | 512 |
| The number of Trs of current adding circuit | 8 | 8 | 12 | 12 |
| The number of current sources of current adding circuit | 4 | 4 | 4 | 4 |
| Current per current source in the current adding circuit | 2.56 mA | 2.56 mA | 2.56 mA | 2.56 mA |
| Tr total number | 26632 | 21512 | 37132 | 26892 |
| Power of CDF/F | 1574.4 mW | 806.4 mW | 352.8 mW | 180.7 mW |
| Power of current adding circuit | 10.2 mW | 10.2 mW | 2.3 mW | 2.3 mW |
| Total power | 1584.6 mW | 816.6 mW | 355.1 mW | 183.0 mW |

Since the correlators are of the current adding type, the maximum operating frequency of the circuit is 4 GHz or higher and the high speed operation can be performed.

As mentioned above, according to the invention, since the switching means for shutting off the drive current of the delay means at the OFF timing of the clock pulse is provided, there is the effect that the power consumption can be largely reduced as compared with the conventional technique.

In case of using the current delay means as the delay means, there is an effect that the code division multiplex communications system having the high operating speed and the small power consumption can be provided.

What is claimed is:

1. A code division multiplex communications system comprising:

receiving means for receiving a radio wave and transforming the radio wave to an electric signal;

delaying means for sequentially reading the electric signal at a timing of a clock pulse;

switching means for shutting off a drive current of the delaying means at an OFF timing of the clock pulse;

adding and subtracting means for adding and subtracting outputs of the delaying means in accordance with a spread code; and reproducing means for reproducing a transmission signal on the basis of an output of the adding and subtracting means.

2. The system according to claim 1, wherein the receiving means receives the radio wave and transforming the received signal to an intermediate frequency signal.

3. The system according to claim 1, wherein the receiving means receives the radio wave and transforming the received radio wave to a baseband signal.

4. The system according to claim 1, wherein the delaying means has voltage-current converting means and current delaying means, converts the electric signal to a current signal, and after that, sequentially reads the current signal by the current delaying means at the timing of the clock pulse.

5. The system according to claim 4, wherein the current delaying means is constructed by current flip-flops of the number twice as many as the number of chips of the spread code.

6. The system according to claim 5, wherein the current flip flop is constructed by serially connecting a first sample and hold circuit for sampling an input current at the leading edge of a first clock pulse and holding at the trailing edge of the first clock pulse and a second sample and hold circuit for sampling an input current at the leading edge of a second clock pulse and holding at the trailing edge of the second clock pulse.

7. The system according to claim 4, wherein the adding and subtracting means comprises: spread code output means for outputting the spread code; switching means for connecting each output of the current delaying means to a first or second current path for addition of currents on the basis of an output of the spread code output means; and subtracting means for subtracting the current of the second current path from the current of the first current path.

8. The system according to claim 7, wherein first and second current mirror circuits are connected in series in the subtracting means, a current of the second current path is supplied to an input terminal of the first current mirror circuit, a current of the first current path is supplied to an output terminal of the first current mirror circuit and an input terminal of the second current mirror circuit, and an output is obtained from an output terminal of the second current mirror circuit.

9. The system according to claim 4, wherein the adding and subtracting means comprises:

spread code output means for outputting the spread code;

adding means for adding currents by connecting outputs of the current delaying means to the first or second current path on the basis of an output of the spread code output means;

subtracting means for subtracting a current of the second current path from a current of the first current path; and switching means for turning off the operation of the adding means and the subtracting means at an OFF timing of the clock pulse.

10. The system according to claim 4, wherein the reproducing means comprises:

a current-voltage converter for converting an output of the adding and subtracting means to a voltage signal; and a demodulator for reproducing a transmission signal by integrating an output of the current-voltage converter.

* * * * *